United States Patent

[11] 3,630,683

[72] Inventor Wayne F. Robb
 Aurora, Colo.
[21] Appl. No. 806,339
[22] Filed Feb. 14, 1969
[45] Patented Dec. 28, 1971
[73] Assignee Telan Corporation
 Denver, Colo.

[54] REACTOR DEVICE FOR ION EXCHANGE RESINS AND THE LIKE
 11 Claims, 4 Drawing Figs.
[52] U.S. Cl. .................................................. 23/253 A,
 23/292, 210/282
[51] Int. Cl. .................................................. B01d 27/02,
 B01l 3/00
[50] Field of Search ........................................... 23/254, 253
 A, 292; 210/282; 137/513.25, 513.3, 513.7

[56] References Cited
UNITED STATES PATENTS
2,097,650 11/1937 Stampe.......................... 23/292

Primary Examiner—Morris O. Wolk
Assistant Examiner—R. M. Reese
Attorney—John E. Reilly ABSTRACT: A reactor device includes a receptacle having a lower controlled orifice provided by an imperforate disclike member forming a narrow annular passage which confines materials to the receptacle and passes a liquid from the receptacle at a controlled, uniform rate. The device is applicable to the treatment of human matter such as whole blood or its derivatives and urine, to be analyzed in clinical or industrial laboratories.

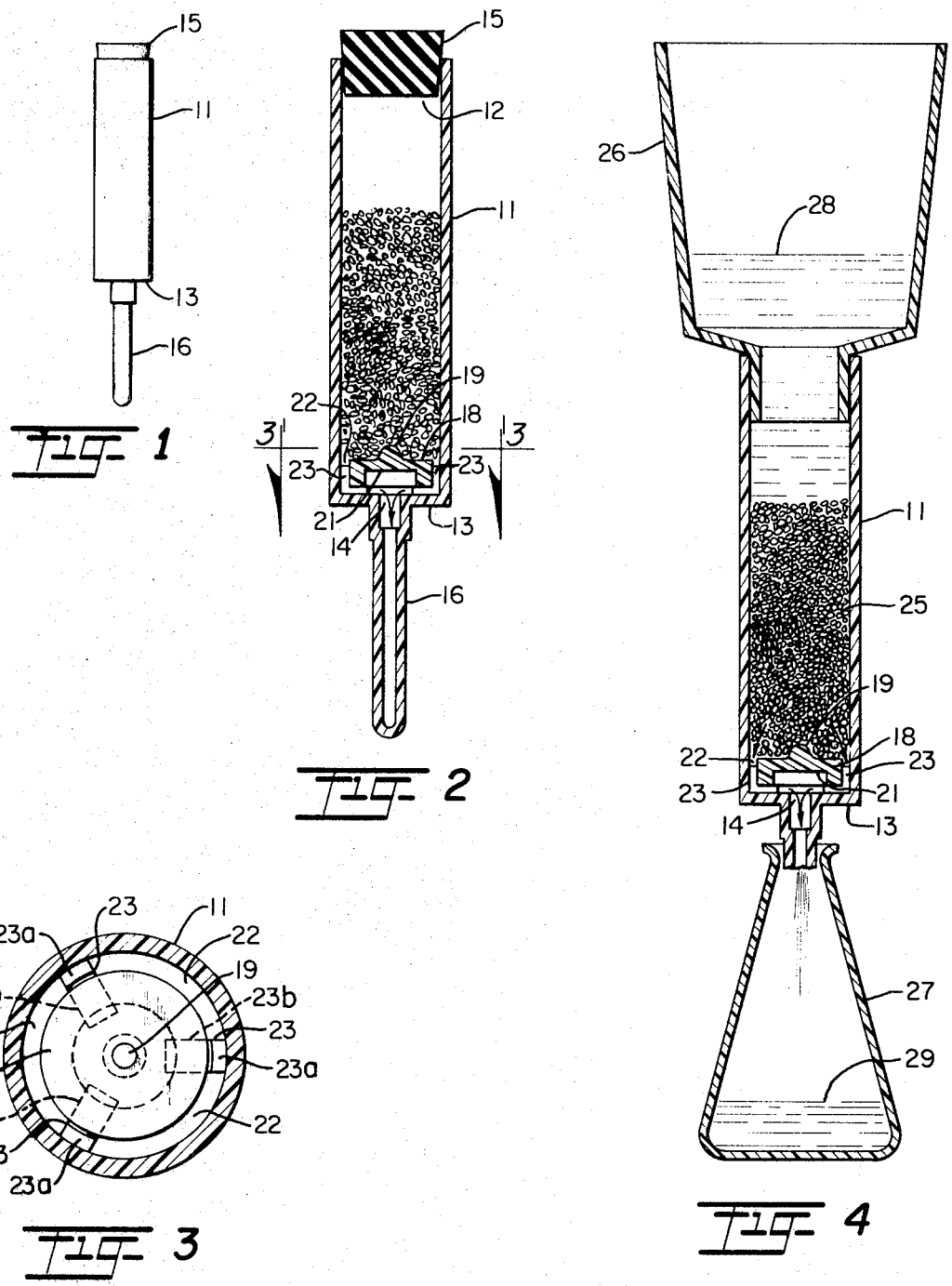

REACTOR DEVICE FOR ION EXCHANGE RESINS AND THE LIKE

This invention relates to a novel and improved reactor device for ion exchange reactions and the like which is especially suited for laboratory sample analysis where relatively small quantities of substances are involved.

Substances or materials of different form and chemical composition are frequently reacted with one another either to produce a desired mixture or solution such as dissolving a solid in a liquid and also to separate a mixture into constituents by the process of absorbing a constituent in an absorbent material known as chromatography. In such reactions the amount of exposure between the reacting materials and the time taken for the reaction are frequently important factors to be considered for best results.

For example, in the column-type chromatography, a mass of absorbent material is held in a vertical column and a selected amount of liquid or chemical solution is passed by gravity flow over this material to separate a desired constituent from the liquid which drains as a product from the column. In the treatment of whole blood or its derivatives, such as, blood plasma, sera or serum, an ion exchange resin is utilized to remove constituents thereof for laboratory analysis.

Accordingly it is an object of this invention to provide a simple and reliable reactor device for bringing together and contacting desired materials under controlled conditions over a controlled reaction time with total exposure between materials.

Another object of this invention is to provide a novel and improved reaction device for ion exchange reactions and the like having a controlled orifice to closely regulate the reaction time and liquid flow through the device.

It is yet another object of this invention to provide a novel and improved reactor device for contacting materials of different physical form and chemical composition and separating or filtering selected constituents without the use of a perforated filter medium.

Still a further object of this invention is to provide a novel and improved reactor device for the laboratory analysis especially suited to treat blood or its derivatives.

In accordance with the present invention I provide a reactor device composed essentially of a tubular receptacle having an upper feed inlet into which a liquid is introduced and a lower restricted discharge orifice to contain a reactant material typically in a rigid or semirigid form over which the incoming liquid passes by gravity flow. A disc-shaped imperforate flow control member in the receptacle defines a narrow annular passage or ring which allows only a desired liquid to pass around the control member and through the orifice at a controlled flow rate for a desired reaction time.

This device is applicable to resins, gels or like substances of rigid or semirigid form where its reaction with a liquid is affected by flow rate.

Other objects, advantages and capabilities of the present invention will be more apparent as the description proceeds taken in conjunction with the accompanying drawings, in which:

FIG. 1 is a side elevation view of a reactor device embodying features of the present invention FIG. 2 is an enlarged vertical sectional view of the device as shown in FIG. 1 having a charge of material contained therein.

FIG. 3 is a sectional view taken along lines 3—3 of FIG. 2 showing the position of the control member within the receptacle; and FIG. 4 is a vertical sectional view showing the device of FIG. 1 in operation with its tip portion severed and having a liquid being introduced through a funnel into the receptacle with a liquid passing into a vessel below the orifice.

Referring now to the drawings the illustrative embodiment shown in general comprises a tubular receptacle 11 of generally cylindrical shape and generally uniform cross section forming an interior of a reaction reservoir having an opening 12 in the upper end providing a feed inlet to the reservoir, together with a lower stepped or shoulder portion 13 turning in from the cylindrical sidewall and a lower, centrally disposed, restricted discharge orifice 14. A removable cap closure 15 slidably fits into the top of the upper open end to seal the top of the receptacle and a hollow, elongated tip portion, which is closed at its lower end, extends downwardly from the shoulder 13 and is in flow communication with the orifice to seal the bottom of the receptacle. The tip portion 16 is severable and can be cut above its closed end to permit liquid to flow through the orifice 14 as described more fully hereinafter.

A reaction and flow control member 18 is disposed in the bottom of the receptacle 11 above the discharge orifice 13. This member is made in the form of a round disc for the cylindrical receptacle shown which has an essentially flat upper surface with an upstanding dimple 19, which is not essential to its main function but facilitates its insertion into the tubular receptacle, and has a hollow recess 21 formed in its underside above the orifice, which improves the flow action through member 18 and may therefore be characterized as an inverted dishlike member. The control member is positioned in the receptacle spaced from inner sidewall and inner shoulder surfaces of the receptacle to define with the sidewall surface a narrow annular passage 22 and this spacing is generally uniform throughout its circumferential extent. This spacing is accomplished by providing a plurality of thin, narrow ribs 23 spaced apart one from the other which are arranged circumferentially on the inner surface of the receptacle. Each rib is generally L-shaped having an upright leg 23a formed on the sidewall and a horizontal leg 23b formed on the shoulder surface. Three ribs are shown disposed circumferentially at 120° intervals and provide a seat for the control member 18. The spacing between the ribs and the control member has sufficient clearance to permit the control member to be formed separately and then inserted into position in the receptacle. While the ribs are shown on the receptacle wall as a preferred form it is understood that ribs formed on the control member could be used to engage the wall of the receptacle and would also perform a spacing function to define the narrow annular restricted passage. The receptacle including the tip portion and ribs is preferably constructed as an integral unit and this unit together with the flow control member is preferably made of an inert plastic such as polypropylene or methylpentene polymers.

Typically the receptacle will contain a quantity of material 25 of a rigid or semirigid form which is confined therein in a column. This material may be a resin, gel or like substance affected by flow rate. In the treating of blood samples in this would be an ion exchange resin typically of small beadlike particles which is capable of removing specific ingredients from blood and its derivatives or may also be an isotopically tagged resin.

The general operation of the above-described reactor device will now be explained with reference to FIG. 4. A funnel 26 having a suitable tube extension is inserted into the open end of receptacle 11 after the cap 15 has been removed. A vessel or cup 27 is placed below the orifice to receive liquid flowing therefrom. A plurality of these assemblies may be supported in a rack for the treatment of many liquid samples. A liquid or sample 28 of a selected quantity is poured into the funnel 26 and it passes by gravity flow down through the column of material 25 and will initially fill to a level as shown in FIG. 4 so it also moves upwardly through the column and thereby provides good surface contact between the liquid and the column of material. A liquid product 29 will flow from the column of material 25 through the annular passage 22 around member 18 and then radially inwardly along the shoulder and finally downwardly through the restricted orifice 14 to the vessel 27. The control member 18 functions to pass the liquid at a controlled uniform rate and at the same time retains the column of material in the receptacle as well as other impurities which may be introduced with the liquid 27.

This reactor device has particular applicability to the treatment of blood samples to remove inorganic iodide and also for the determination of thyroxine. In removing inorganic iodide the material 25 may be an ion exchange resin such as Lobeads of Dowex 1–X8. After the device shown in FIG. 4 is in place in an upright position the tip portion is cut or snipped and a selected quantity of serum such as 2–3 ml. is poured into the funnel 26 and the liquid product passes from the column into the bottom-receiving receptacle. The advantages of this device for the removal of inorganic iodide is that serum clots and fibers along with the ion exchange resin remain confined to the receptacle. The device is a complete unit eliminating other parts formerly used to remove inorganic iodide including a filter media to separate constituents. Identification errors are minimized and there is a substantial reduction in cost over previous treatments.

In order to make a determination of thyroxine (T4) an anionic resin is prepared in the receptacle. Serum which has first been diluted with sodium hydroxide is passed through the column of resin. Proteins, iodinated tyrosines and some organic containments are removed by washing the resin column with each of the solution of: an acetate buffer, concentrated urea solution and dilute acetic acid solution. Thyroxine remains absorbed in the column. Glacial acetic acid is used to move the thyroxine down the column which is then eluted with acetic acid. A second wash of acetic acid is collected and the iodine measured in both fractions. It has been found that as compared to previous devices the number of washes required is less and the recovery is improved.

By way of example but not limitation the device shown in FIG. 1 is approximately to scale and for serum analysis the interior diameter of the receptacle is 0.340 inches with the circular control member being 0.006 inches to 0.010 inches smaller in diameter to define a very narrow annular passage. It is understood however that the volume of the receptacle reservoir and the size of the annular passage will be varied to meet the requirements of the size of particle of the column of material and the liquid being treated to establish the desired reaction time and flow rate for particular materials.

Although the present invention has been described with a certain degree of particularity, it is understood that the present disclosure has been made only by way of example and that changes in details of structure and system components may be made without departing from the spirit thereof.

What is claimed is:

1. In a reactor device for ion exchange reactions and the like, a tubular receptacle having an upper feed inlet and a lower restricted discharge orifice, an exchange material in the receptacle for contacting with a fluid delivered into the feed inlet, flow control means in the bottom of the receptacle below the exchange material defining a narrow annular passage of a preselected size to control the flow rate of a liquid delivered through the feed inlet, through the exchange material in the receptacle, past said flow control means and through said discharge orifice.

2. In a reactor device according to claim 1 wherein one said receptacle and said flow control means includes an imperforate disc member having downwardly and inwardly projecting spaced ribs to hold said flow control disc member closely spaced to said receptacle to define said passage.

3. In a reactor device according to claim 1 wherein said receptacle has an inturned shoulder with circumferentially arranged ribs extending along its upper surface and upwardly along the sidewall of the receptacle to seat the flow control means closely spaced to the receptacle to define said passage.

4. In a reactor device according to claim 1 wherein said imperforate control means is generally disclike in shape having a recessed portion along its underside above the orifice.

5. In a reactor device according to claim 1 wherein said control means is in the form of a generally disclike member removably insertable through the feed inlet into the receptacle.

6. In a reactor device according to claim 1 including a removable cap to close and seal the feed end of the receptacle.

7. In a reactor device according to claim 1 including a hollow severable tip portion closed at one end in flow communication with the discharge orifice to permit flow through the orifice upon the severance of the tip portion.

8. In a reactor device according to claim 7 wherein said receptacle and tip portion are formed as an integral unit, said unit and control member being made of a chemically inert plastic.

9. A reactor device for ion exchange reactions and the like comprising a tubular receptacle having an upper feed inlet and a lower restricted discharge orifice, said receptacle containing an exchange material for reaction with a liquid delivered into the feed inlet, an imperforate reaction and flow control member in the bottom of the receptacle above the discharge orifice to confine the solid and semisolid portions of the exchange material to the receptacle and defining with the receptacle a narrow annular passage along the inner wall of the receptacle for controlling reaction time in the column and the flow rate of liquid phase reaction products passing by gravity flow past said control member through said discharge orifice.

10. A reactor device according to claim 9 including a funnel in the feed inlet to pass a feed liquid to the receptacle and a vessel in a flow-receiving relation to the orifice to receive the reaction products.

11. A reactor device to treat samples of whole blood and the like for laboratory analysis comprising a tubular receptacle having an upper feed inlet and a lower shoulder portion with a restricted discharge orifice, said receptacle containing an ion exchange material for reaction with whole blood delivered into the feed inlet, an imperforate generally disclike reaction and flow control member in the bottom of the receptacle above the discharge orifice to confine the ion exchange material to the receptacle and defining with the receptacle a narrow annular passage along the inner wall of the receptacle for controlling the reaction time in the column and the flow rate of the liquid phase reaction products passing by gravity past said control member through said discharge orifice, said receptacle having downwardly projecting circumferentially arranged ribs on the shoulder portion above the orifice to seat and space the control member in the receptacle.

* * * * *